(12) United States Patent
Liu et al.

(10) Patent No.: US 12,307,986 B2
(45) Date of Patent: May 20, 2025

(54) CONTROL CIRCUIT, CONTROL METHOD AND DISPLAYING DEVICE

(71) Applicant: HKC CORPORATION LIMITED, Shenzhen (CN)

(72) Inventors: Honghai Liu, Shenzhen (CN); Yongxin Ruan, Shenzhen (CN); Dewei Yu, Shenzhen (CN); Haoxuan Zheng, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 18/546,231

(22) PCT Filed: Dec. 22, 2022

(86) PCT No.: PCT/CN2022/140897
§ 371 (c)(1),
(2) Date: Aug. 11, 2023

(87) PCT Pub. No.: WO2023/216602
PCT Pub. Date: Nov. 16, 2023

(65) Prior Publication Data
US 2024/0221689 A1 Jul. 4, 2024

(30) Foreign Application Priority Data
May 9, 2022 (CN) .......................... 202210498041.2

(51) Int. Cl.
*G09G 3/34* (2006.01)
(52) U.S. Cl.
CPC ... *G09G 3/3406* (2013.01); *G09G 2320/0247* (2013.01); *G09G 2320/064* (2013.01)

(58) Field of Classification Search
None
See application file for complete search history.

(56) References Cited

U.S. PATENT DOCUMENTS

| 7,791,584 B2 * | 9/2010 | Korcharz | G09G 3/342 |
| | | | 327/175 |
| 8,363,004 B2 * | 1/2013 | Ye | G09G 3/3648 |
| | | | 315/291 |

(Continued)

FOREIGN PATENT DOCUMENTS

| CN | 102036437 | 4/2011 |
| CN | 102257881 | 11/2011 |

(Continued)

OTHER PUBLICATIONS

KIPO, Office Action for KR Application No. 10-2024-7017949, Nov. 19, 2024.

(Continued)

*Primary Examiner* — Andre L Matthews
(74) *Attorney, Agent, or Firm* — Hodgson Russ LLP

(57) ABSTRACT

A control circuit includes a sampling sub-circuit, a switching sub-circuit, and a working power supply, where the sampling sub-circuit is configured to collect a level signal corresponding to a pulse width modulation signal, one end of the switching sub-circuit is connected to the sampling sub-circuit, the other end is connected to at least one group of signal feedback ends, each of which includes at least two feedback points, the feedback points are configured to be connected to a light emitting element, and the switching sub-circuit is capable of being switched between a first mode and a second mode based on a relationship between the level signal and a preset threshold.

17 Claims, 3 Drawing Sheets

(56) References Cited

U.S. PATENT DOCUMENTS

| | | | | |
|---|---|---|---|---|
| 2010/0301760 | A1* | 12/2010 | Liu | H05B 45/3725 |
| | | | | 315/186 |
| 2011/0032008 | A1* | 2/2011 | Zhao | H03K 7/08 |
| | | | | 327/114 |
| 2011/0291585 | A1 | 12/2011 | Foo | |
| 2011/0309758 | A1* | 12/2011 | Yu | H05B 45/46 |
| | | | | 315/192 |
| 2013/0271032 | A1* | 10/2013 | Hua | H05B 45/46 |
| | | | | 315/297 |
| 2013/0285625 | A1* | 10/2013 | Ge | H05B 45/46 |
| | | | | 323/234 |
| 2014/0191670 | A1* | 7/2014 | Ge | H05B 45/46 |
| | | | | 315/186 |
| 2015/0244274 | A1 | 8/2015 | Fahlenkamp et al. | |
| 2018/0317292 | A1 | 11/2018 | Katsura et al. | |
| 2022/0230597 | A1* | 7/2022 | Liu | H05B 45/347 |
| 2023/0064288 | A1* | 3/2023 | Luo | H02M 1/0041 |

FOREIGN PATENT DOCUMENTS

| | | |
|---|---|---|
| CN | 102665325 | 9/2012 |
| CN | 103166434 | 6/2013 |
| CN | 103428959 | 12/2013 |
| CN | 103440848 | 12/2013 |
| CN | 103582258 | 2/2014 |
| CN | 105517250 | 8/2017 |
| CN | 109496009 | 3/2019 |
| CN | 109587882 | 4/2019 |
| CN | 109922557 | 6/2019 |
| CN | 111599319 | 8/2020 |
| CN | 114596821 | 8/2022 |
| EP | 4339932 | 3/2024 |
| JP | 3191537 | 6/2014 |
| WO | 2020071067 | 4/2020 |
| WO | 2020073622 | 4/2020 |

OTHER PUBLICATIONS

EPO, Extended European Serach Report for EP Application No. 22930140.3, Sep. 13, 2024.

CNIPA, First Office Action for CN Application No. 202210498041.2, Jun. 15, 2022.

WIPO, International Search Report and Written Opinion for PCT/CN2022/140897, Mar. 10, 2023.

* cited by examiner

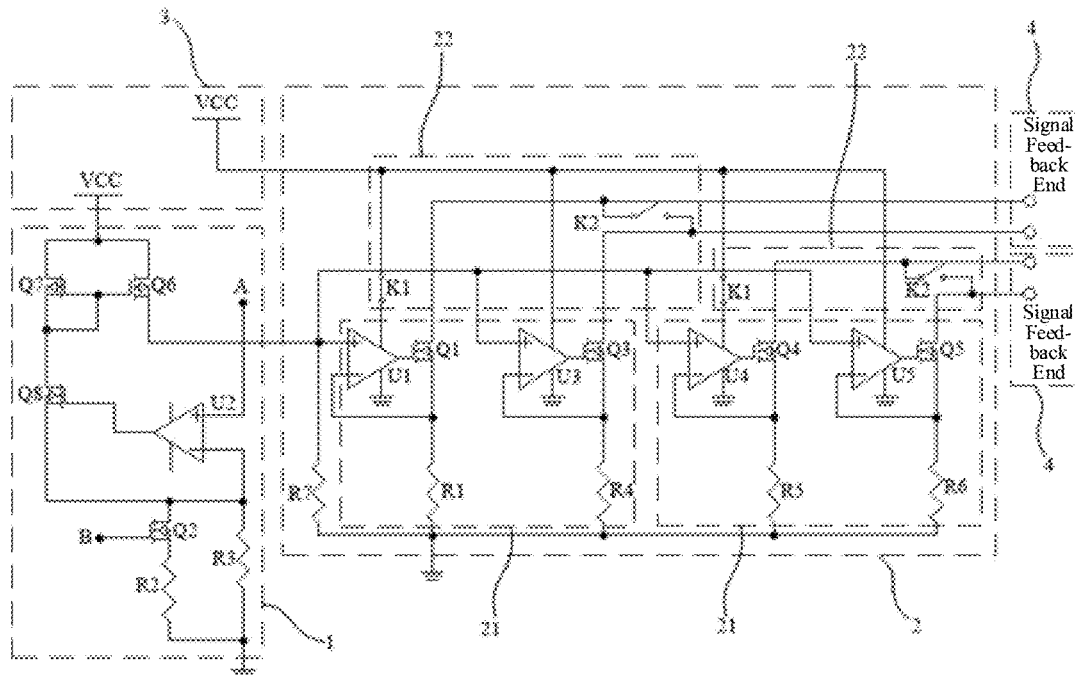

FIG. 3

Control Sampling Sub-circuit to Collect Level Signal Corresponding to Pulse Width Modulation Signal, and Transmit Level Signal to Switching Sub-circuit, Wherein One End of Switching Sub-circuit Be Connected to Sampling Sub-circuit, Other End of Switching Sub-circuit Be Connected to at Least One Group of Signal Feedback Ends, Each of Signal Feedback Ends Comprise at Least Two Feedback Points, Each Feedback Point is Configured to Be Connected to Light Emitting element, and Switching Sub-circuit and Sampling Sub-circuit Be Both Connected to Working Power Supply ⟶ S10

Control Switching Sub-circuit to Receive Level Signal, and Control Switching Sub-circuit to Be Switched between First Mode and Second Mode Based on Relationship between Level Signal and Preset Threshold, Wherein in First Mode, Switching Sub-circuit Be Capable of Controlling Mutual Independence of Feedback Points in Signal Feedback Ends, and in Second Mode, Switching Sub-circuit Be Capable of Controlling Mutual Association of Feedback Points in Signal Feedback Ends, Mutual Independence of Feedback Points Represents that Feedback Points Are Provided with Mutually Independent Circulating Lines, and Mutual Association of Feedback Points Represents That Feedback Points Share One Circulating Line ⟶ S20

FIG. 4

CONTROL CIRCUIT, CONTROL METHOD AND DISPLAYING DEVICE

CROSS-REFERENCE TO RELATED APPLICATIONS

This application is a national stage entry under 35 U.S.C. § 371 of International Application No. PCT/CN2022/140897, filed Dec. 22, 2022, which claims priority to Chinese Patent Application No. 202210498041.2, filed May 9, 2022, the entire disclosures of which are incorporated herein by reference.

TECHNICAL FIELD

The present application relates to the technical field of display driving, and more particularly, to a control circuit, a control method, and a displaying device.

BACKGROUND

In a back light of a display panel, a light-emitting diode is controlled to be turned on through PWM (Pulse Width Modulation). However, a PWM signal is set as a low-level signal. In the case that a low-level PWM signal is converted into a current signal, the current value is low. The low current causes the amplitude of the voltage fluctuation at a feedback end of the light-emitting diode (LED) to become large. The large amplitude fluctuation of the voltage causes the fluctuation of the brightness of the light-emitting diode, resulting in continuous flickering of the light-emitting diode.

The above information disclosed in this Background section is only for enhancing the understanding of the background of the present application, and therefore it may contain information that does not constitute the prior art that is already known to a person of ordinary skill in the art.

SUMMARY

There are provided a control circuit, a control method, and a displaying device according to embodiments of the present application. The technical solution is as below:

According to a first aspect of the present application, the present application provides a control circuit, comprising:
  a sampling sub-circuit configured to collect a level signal corresponding to a pulse width modulation signal;
  a switching sub-circuit, wherein one end of the switching sub-circuit is connected to the sampling sub-circuit, the other end of the switching sub-circuit is connected to at least one group of signal feedback ends, wherein each of the signal feedback ends comprises at least two feedback points, each of the feedback points is configured to be connected to a light emitting element, and the switching sub-circuit is capable of being switched between a first mode and a second mode based on a relationship between the level signal and a preset threshold: in the first mode, the switching sub-circuit is capable of controlling mutual independence of the feedback points in the signal feedback ends; and in the second mode, the switching sub-circuit is capable of controlling mutual association of the feedback points in the signal feedback ends, wherein the mutual independence of the feedback points represents that the feedback points are provided with mutually independent circulating lines, and the mutual association of the feedback points f represents that the feedback points share one circulating line; and
  a working power supply connected to the sampling sub-circuit and the switching sub-circuit and supplying power to the sampling sub-circuit and the switching sub-circuit.

According to a second aspect of the present application, the present application further provides a control method, comprising:
  controlling a sampling sub-circuit to collect a level signal corresponding to a pulse width modulation signal, and transmitting the level signal to a switching sub-circuit, wherein one end of the switching sub-circuit is connected to the sampling sub-circuit, the other end of the switching sub-circuit is connected to at least one group of signal feedback ends, wherein each of the signal feedback ends comprises at least two feedback points, each the feedback point is configured to be connected to a light emitting element, and the switching sub-circuit and the sampling sub-circuit are both connected to a working power supply; and
  controlling the switching sub-circuit to receive the level signal, and controlling the switching sub-circuit to be switched between a first mode and a second mode based on a relationship between the level signal and a preset threshold, wherein in the first mode, the switching sub-circuit is capable of controlling mutual independence of the feedback points in the signal feedback ends, and in the second mode, the switching sub-circuit is capable of controlling mutual association of the feedback points in the signal feedback ends, wherein the mutual independence of the feedback points represents that the feedback points are provided with mutually independent circulating lines, and the mutual association of the feedback points represents that the feedback points share one circulating line.

According to a third aspect of the present application, the present application further provides a displaying device, comprising a plurality of light emitting elements and a control circuit as described above, wherein the feedback points are connected to the light emitting elements in a one-to-one correspondence.

It is to be understood that both the foregoing general description and the following detailed description are exemplary only, and are not intended to limit the present application.

BRIEF DESCRIPTION OF THE DRAWINGS

The accompanying drawings here, which are incorporated in and constitute a part of the specification, illustrate embodiments consistent with the present application and, together with the specification, serve to explain the principles of the present application.

In order that the contents of the present disclosure may be more clearly understood, the present disclosure is described in further detail below in accordance with specific embodiments of the present disclosure and with reference to the accompanying drawings, in which:

FIG. 3 is a circuit diagram according to the first embodiment of the present application.

FIG. 4 is a flowchart of a control method according to a second embodiment of the present application.

DETAILED DESCRIPTION

Figure 1:
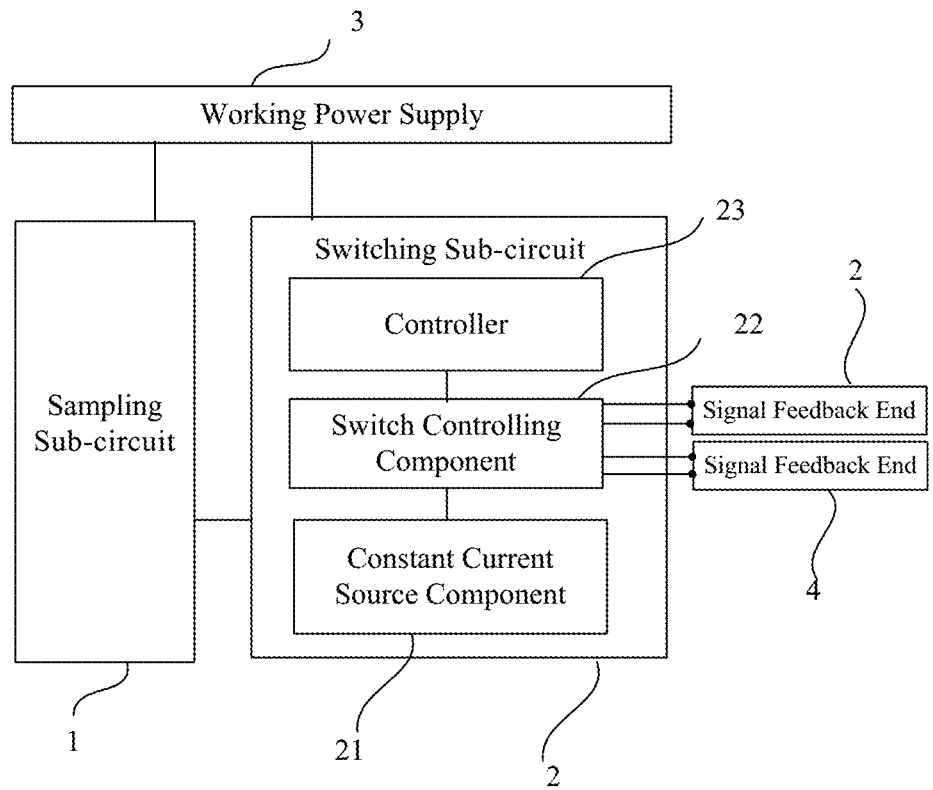
FIG. 1 is a schematic diagram of a connection in a control circuit according to a first embodiment of the present application.

While the present application is susceptible of embodiments in many different forms, there is shown in the accompanying drawings and will be described in detail herein, only some of the embodiments, with the understanding that the specification is to be considered an exemplification of the principles of the present application and is not intended to limit the present application to that which is described herein.

Thus, a feature indicated in the specification is intended to describe one of the features of one embodiment of the present application without implying that every embodiment of the present application must have the described feature. Furthermore, it should be noted that the specification describes a number of features. Although certain features may be combined together to illustrate a possible system design, these features may also be used in other combinations that are not explicitly described. Thus, the illustrated combinations are not intended to be limiting unless otherwise indicated.

In the embodiments shown in the accompanying drawings, directional indications (such as up, down, left, right, front, and back) are used to explain that the structure and movement of the various elements of the present application are not absolute but relative. These descriptions are appropriate when the elements are in the positions shown in the accompanying drawings. If the description of the position of these elements changes, the indication of these directions changes accordingly.

Example embodiments will now be described more fully with reference to the accompanying drawings. The example embodiments are capable, however, of being embodied in many forms and should not be construed as limited to the exemplars set forth herein: rather, they are provided so that the description of the present application will be thorough and complete, and will fully convey the concept of the example embodiments to those skilled in the art. The accompanying drawings are merely schematic illustrations of the present application and are not necessarily drawn to scale. The same reference numerals in the accompanying drawings denote the same or similar parts, and repeated description thereof will be omitted.

The preferred embodiments of the present application are further described in detail below with reference to the accompanying drawings of the present specification.

Embodiment 1

Figure 2:
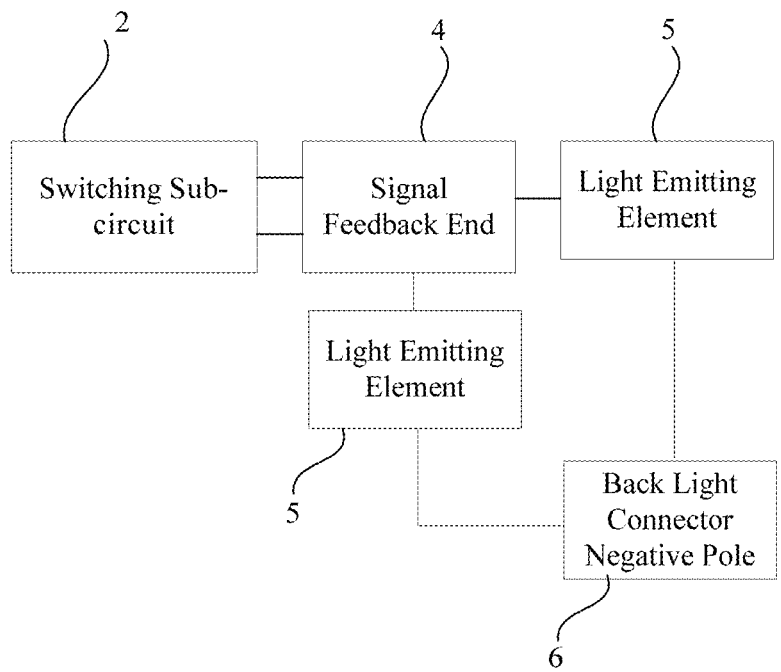
FIG. 2 is a schematic diagram of a connection of a light emitting element connected with the control circuit in FIG. 1 according to the present application.

Referring to FIG. 1 and FIG. 2, the present application provides a control circuit, which includes a sampling sub-circuit 1, a switching sub-circuit 2, and a working power supply 3. The working power supply 3 is connected to the sampling sub-circuit 1 and the switching sub-circuit 2 and supplies power to the sampling sub-circuit 1 and the switching sub-circuit 2. The working power supply 3 is a direct-current power supply VCC, the power supply of the working power supply 3 ensures that various electronic components in the sampling sub-circuit 1 and the switching sub-circuit 2 operate and work normally, and the voltage of the working power supply 3 is 5 V or 12 V. The sampling sub-circuit 1 is configured to collect a level signal corresponding to a pulse width modulation signal, which is also called a PWM signal for short. One end of the switching sub-circuit 2 is connected to the sampling sub-circuit 1, the other end of the switching sub-circuit 2 is connected to at least one group of signal feedback ends 4, and each of the signal feedback ends 4 includes at least two feedback points.

It is noted that the number of the signal feedback ends 4 is multiple, and is not limited to one, for example, two or three, and the number of the feedback points in each group of the signal feedback ends 4 is not limited to two, and is three or more. The feedback points are configured to be connected to a light emitting element 5. In general, one end of the light emitting element 5 is connected to the feedback point, and the other end of the light emitting element 5 is connected to a positive pole 6 of a back light connector. By switching on the switching sub-circuit 2, the light emitting element 5 is turned on or off. The light emitting element 5 is an LED (Light-Emitting Diode), an OLED (Organic Light-Emitting Diode), or an AMOLED (Active-Matrix Organic Light-Emitting Diode).

In addition, in the embodiment, the number of the light emitting elements 5 connected to the feedback points is not limited to one, and a light string including a plurality of light emitting elements 5 is provided. The switching sub-circuit 2 is capable of be switched between a first mode and a second mode based on a relationship between the level signal and a preset threshold. In the first mode, the switching sub-circuit 2 is capable of controlling mutual independence of the feedback points in the signal feedback ends 4, and the mutual independence of the feedback points means that the current or voltage between the feedback points is separated and each feedback point is provided with an independent circulating line. In the second mode, the switching sub-circuit 2 is capable of controlling mutual association of the feedback points in the signal feedback ends 4, and the mutual association may be understood that the feedback points are connected together, and share one circulating line. The preset threshold is understood as a basis for judging a level of the level signal. The preset threshold is generally adjusted within the range of 0.1% to 10%, and the preset threshold is a specific value in the range or a range value. For example, in the case that the preset threshold is 5%, it is determined whether the switching sub-circuit 2 is switched to the first mode or the second mode with 5% as a boundary. In addition, the preset threshold is also 0.1%, 0.3%, 0.5%, 1%, 2%, 3%, 4%, 6%, 7%, 8%, 9%, 10% and the like.

In the technical solution of the embodiment, the working power supply 3 supplies power to the operation of the sampling sub-circuit 1 and the switching sub-circuit 2, and the sampling sub-circuit 1 sends the collected level signal to the switching sub-circuit 2, where the level signal corresponds to the pulse width modulation signal. The switching sub-circuit 2 is capable of being switched between the first mode and the second mode according to a driving level signal. In the first mode, the feedback points are mutually independent, and at this time, the current connected to each feedback point is also supplied independently through different lines. In the second mode, the two feedback points are mutually associated, and at this time, the two feedback points are connected to the same line. In the case of a low level signal, the switching sub-circuit 2 is switched to the second mode, which is equivalent to merging the two low-current lines together, such that the magnitude of current in the line is increased. Through the increase of current, the relative fluctuation of voltage is reduced, and the brightness of the LED tends to be stable without a change from high to low. Therefore, according to the technical solution, the brightness flicker of the LED is effectively reduced.

Referring to FIG. 3, in order to effectively complete the switching operation of the switching sub-circuit 2, the switching sub-circuit 2 includes at least one group of constant current source components 21 and at least one group of switch controlling components 22, and the constant current source components 21, the switch controlling components 22, and the signal feedback ends 4 are disposed in one-to-one correspondence, where each of the switch controlling components 22 includes a first switch K1 and a second switch K2.

Each of the constant current source components 21 includes at least two constant current sources, each of the constant current sources is provided with a power supply end, an input end, and an output end. The input end is connected to the sampling sub-circuit 1 through an input line, the power supply end is connected to the working power supply 3 through a power supply line, and the output end is connected to a feedback point of the signal feedback ends 4 through a feedback line. The constant current source provides a stable direct current, and the light emitting element 5 keeps lighted through the stable direct current without disconnection at intervals. And thus there is no flickering stripes on a display screen, so that a picture is displayed well. The power supply end of the constant current source includes a positive pole of a power supply and a negative pole of the power supply, the positive pole of the power supply is connected to the working power supply 3, and the negative pole of the power supply is grounded.

Among the plurality of power supply lines, one power supply line is not provided with the first switch K1, and each of the remaining power supply lines is provided with the first switch K1. Among the signal feedback end 4, each feedback line connected to each feedback point is connected through the second switch; and one or more second switches K2 are provided. In the case that a plurality of second switches K2 are provided, the plurality of second switches K2 communicate with the respective feedback lines. In the constant current source connected to the power supply line not provided with the first switch K1, the working power supply 3 is always kept connected thereto. In this way, in the case that the first switches K1 in the remaining power supply lines are turned off, the second switches K2 are turned on, such that the constant current sources in the constant current source components 21 all communicate with the working power supply through one line.

Specifically, during the operation of the switching sub-circuit 2, in the first mode, the first switches K1 are turned on, and the second switches K2 are turned off, and in the case that a plurality of first switches K1 and a plurality of second switches K2 are provided, the first switches K1 are all in an on state, and the second switches K2 are all in an off state. In the second mode, the first switches K1 are turned off, and the second switches K2 are turned on. Similarly, in the case that a plurality of first switches K1 and a plurality of second switches K2 are provided, the first switches K1 are all in an off state, and the second switches K2 are all in an on state.

In one of aspects, a plurality of constant current source components 21 are provided, the plurality of constant current source components 21 are disposed in parallel, and each constant current source component 21 is connected to one group of signal feedback ends 4. It is seen that a plurality of signal feedback ends 4 are provided, a plurality of switch controlling components 22 are also provided, and each group of constant current sources is connected to one group of switch controlling components 22. Each group of switch controlling components 22 controls the connection state between each group of signal feedback ends 4 and the constant current source components 21. As shown in FIG. 3, two constant current source components 21 are provided, but the number is not limited thereto, and more constant current source components 21 are provided.

In one of aspects, the switching sub-circuit 2 further includes a controller 23 connected to the switch controlling components 22, and the controller 23 is configured to control the on or off of the first switches K1 and the on or off of the second switches K2. The controller 23 is understood as an MCU (Microcontroller Unit), a memory is provided in the MCU, and the preset threshold is stored in the memory. The MCU further includes a processor. In the case that the switching sub-circuit 2 works, the processor is configured to call the preset threshold stored in the memory, to compare the duty ratio in the received PWM signal with the preset threshold in the memory, and to perform subsequent control operations according to the comparison result therebetween. The duty ratio of the PWM signal corresponds to the level signal collected by the sampling sub-circuit 1, where the duty ratio is a ratio of a power-on time to a total time in one pulse signal cycle. It is known that the lower the duty ratio, the shorter the power-on time. The level signal collected by the sampling sub-circuit 1 is converted from the duty ratio. In the case that the duty ratio is low, the level signal is at a low level, and in the case that the duty ratio is high, the level signal is at a high level.

In one of aspects, each of the constant current sources includes a first operational amplifier U1, a first field-effect transistor Q1, and a first resistor R1, a positive pole of a power supply of the first operational amplifier U1 is connected to the working power supply 3, a negative pole of the power supply of the first operational amplifier U1 is grounded, a signal input positive pole of the first operation amplifier U1 is connected to the sampling sub-circuit 1, a signal input negative pole of the first operational amplifier U1 is connected to the first resistor R1, the other end of the first resistor R1 is grounded, a signal output end of the first operational amplifier U1 is connected to the first field-effect transistor Q1, one end of the first field-effect transistor Q1 is connected to the first resistor R1, and the other end of the first field-effect transistor Q1 is connected to one feedback point.

For example, two constant current source components 21 are provided, where one constant current source component 21 includes two constant current sources, where one constant current source includes a first operational amplifier U1 and a first field-effect transistor Q1, and one end of the first operational amplifier U1 and one end of the first field-effect transistor Q1 are both connected to a first resistor R1; and the other constant current source includes a third operational amplifier U3 and a first field-effect transistor Q3, and one end of the third operational amplifier U3 and one end of the third field-effect transistor Q3 are both connected to a fourth resistor R4. In the case that the first switches K1 are turned on, and the second switches K2 are turned off, the two constant current sources are connected in parallel. The other constant current source component 21 further includes two constant current sources, where one constant current source includes a fourth operational amplifier U4 and a fourth field-effect transistor Q4, and one end of the fourth operational amplifier U4 and one end of the fourth field-effect transistor Q4 are both connected to a fifth resistor R5; and the other constant current source includes a fifth operational amplifier U5 and a fifth field-effect transistor Q5, and one end of the fifth operational amplifier U5 and one end of the fifth field-effect transistor Q5 are both connected to a sixth resistor R6. In general, the resistances of the first resistor R1, the fourth resistor R4, the fifth resistor R5, and the sixth resistor R6 are equal. In addition, the constant current source components 21 are connected in parallel with a seventh resistor R7, and the resistance of the seventh resistor R7 is also equal to that of the first resistor R1. The field-effect transistor is understood as an MOS transistor, which is the abbreviation of MOSFET. An MOSFET metal-oxide-semiconductor field-effect transistor is called MOSFET for short. Generally MOSFET is a metal-oxide-semiconductor field-effect transistor, or a metal-insulator-semiconductor. G represents a gate: S represents a source; and D represents a drain. The source and the drain of the MOS transistor are interchangeable.

In one of aspects, a sampling sub-circuit 1 includes a second operational amplifier U2, a first sampling point A, and a second sampling point B, where the first sampling point A is connected to a signal input positive pole of the second operational amplifier U2, the second sampling point B is connected to a signal input negative pole of the second operational amplifier U2, and a second field-effect transistor Q2 is disposed between the signal input negative pole of the second operational amplifier U2 and the second sampling point B. The field-effect transistor is equivalent to a switch in the embodiment, and the second field-effect transistor Q2 is turned off at a low level and turned on at a high level. It is seen that the second field-effect transistor Q2 is turned off at the low level. The sampling sub-circuit 1 further includes a second resistor R2 and a third resistor R3, where one end of the second field-effect transistor Q2 is connected to the second resistor R2, and the other end of the second resistor R2 is grounded: one end of the third resistor R3 is connected to the signal input negative pole of the second operational amplifier U2, the other end of the third resistor R3 is grounded, and a circuit formed by the second field-effect transistor Q2 and the second resistor R2 is connected in parallel with the third resistance R3. At the low level, the second field-effect transistor Q2 is turned off, the current flows through the second resistor R2 and the third resistor R3, and in the case that the second resistor R2 is connected in series with the third resistor R3, as the resistance increases, the current flowing to the second operational amplifier U2 decreases. At the high level, the second field-effect transistor Q2 is turned on, the current flows through the second field-effect transistor Q2, and at this time, in the case that the second resistor R2 is connected in parallel with the third resistor R3, as the resistance decreases, the current flowing to the second operational amplifier U2 increases. The signal input positive pole of the operational amplifier is understood as a positive phase input end, and the signal input negative pole of the operational amplifier is also understood as a negative phase input end.

Further, in order to ensure that the current of the circuit formed by the second field-effect transistor Q2 and the second resistor R2 is the same as that of the circuit formed by the second field-effect transistor Q2 and the third resistor R3, the resistances of the second resistor R2 and the third resistor R3 are equal to each other, and the resistances of the second resistor R2 and the third resistor R3 are 60.4 kΩ. In addition, the sampling sub-circuit 1 further includes a sixth field-effect transistor Q6 and a seventh field-effect transistor Q7, both of which are connected to the working power supply 3 and are connected in parallel. The other end of the sixth field-effect transistor Q6 and the other end of the seventh field-effect transistor Q7 are connected to an eighth field-effect transistor Q8. The eighth field-effect transistor Q8 is connected to an output end of the second operational amplifier U2. Furthermore, it is noted that the first sampling point A and the second sampling point B are two lines extending from the same sampling point.

In the technical solution of the present application, the working power supply supplies power to the operation of the sampling module and the switching module, and the sampling module sends the collected level signal to the switching module. The level signal corresponds to the pulse width modulation signal. The switching module is capable of being switched between the first mode and the second mode according to the driving level signal. In the first mode, the feedback points are mutually independent, and at this time, the current connected to each feedback point is also independent. In the second mode, the two feedback points are mutually associated, and at this time, the two feedback points are connected to the same line. In the case of a low level signal, the switching module is switched to the second mode, which is equivalent to merging the two low-current lines together, such that the magnitude of current in the line is increased. Through the increase of current, the relative fluctuation of voltage is reduced, and the brightness of the LED tends to be stable without a change from high to low. Therefore, according to the technical solution, the brightness flicker of the LED is effectively reduced.

Embodiment 2

The present application further provides a control method (shown in FIG. 4), which includes:

In step S10, a sampling sub-circuit is controlled to collect a level signal corresponding to a pulse width modulation signal, and the level signal is transmitted to a switching sub-circuit. One end of the switching sub-circuit is connected to the sampling sub-circuit, the other end of the switching sub-circuit is connected to at least one group of signal feedback ends. Each of the signal feedback ends includes at least two feedback points, the feedback points are configured to be connected to a light emitting element, and the switching sub-circuit and the sampling sub-circuit are both connected to a working power supply. The working power supply is a direct-current power supply, the power supply of the working power supply ensures that various electronic components in the sampling sub-circuit and the switching sub-circuit operate and work normally. The voltage of the working power supply is 5 V or 12 V. The sampling sub-circuit is configured to collect a level signal corresponding to a pulse width modulation signal, which is also called a PWM signal for short.

In step S20, the switching sub-circuit is controlled to receive the level signal, and the switching sub-circuit is controlled be switched between a first mode and a second mode based on a relationship between the level signal and a preset threshold, In the first mode, the switching sub-circuit is capable of controlling mutual independence of the feedback points in the signal feedback ends, and in the second mode, the switching sub-circuit is capable of controlling mutual association of the feedback points in the signal feedback ends. The mutual association is understood that the feedback points are connected together, and share one circulating line. The preset threshold is understood as a basis for judging a level of the level signal. The preset threshold is generally adjusted within the range of 0.1% to 10%, and the preset threshold is a specific value in the range or a range value. For example, in the case that the preset threshold is 5%, it is determined whether the switching sub-circuit is switched to the first mode or the second mode with 5% as a boundary. In addition, the preset threshold is also 0.1%, 0.3%, 0.5%, 1%, 2%, 3%, 4%, 6%, 7%, 8%, 9%, 10% and the like.

Figure 5:
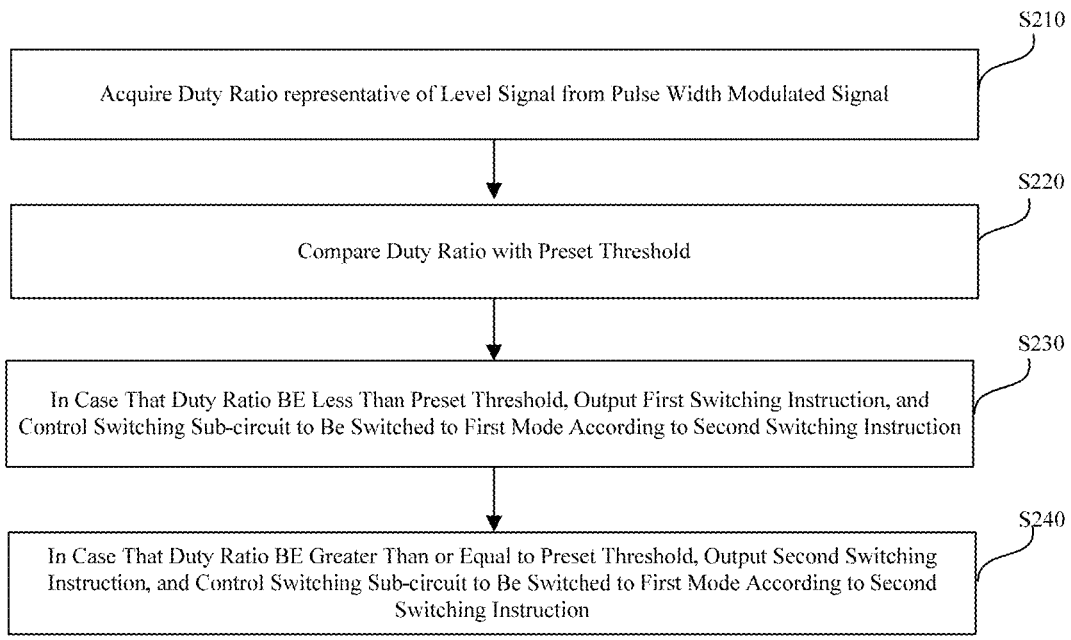
FIG. 5 is a detailed flowchart of step S20 according to the second embodiment of the present application.

Specially, in one of aspects (shown in FIG. 5), the step of controlling the switching sub-circuit to be switched between the first mode and the second mode based on the relationship between the level signal and the preset threshold includes:

In step S210, a duty ratio representative of the level signal is acquired from a pulse width modulated signal. The duty ratio is a ratio of a power-on time to a total time in one pulse signal cycle. It is known that the lower the duty ratio, the shorter the power-on time. The level signal collected by the sampling sub-circuit is converted from the duty ratio. In the case that the duty ratio is low, the level signal is at a low level, and in the case that the duty ratio is high, the level signal is at a high level.

In step S220, the duty ratio is compared with a preset threshold, and a switching instruction is outputted according to the comparison result therebetween.

In step S230, in the case that the duty ratio is less than the preset threshold, a first switching instruction is output, and the switching sub-circuit is controlled to be switched to the second mode according to the first switching instruction. In the second mode, the switching sub-circuit is capable of controlling mutual association of the feedback points in the signal feedback ends. The mutual association is understood that the feedback points are connected together, and share one circulating line.

In step S240, in the case that the duty ratio is greater than or equal to the preset threshold, a second switching instruction is output, and the switching sub-circuit is controlled to be switched to the first mode according to the second switching instruction. In the first mode, the switching sub-circuit is capable of controlling mutual independence of the feedback points in the signal feedback ends; and the mutual independence of the feedback points means that the current or voltage between the feedback points is separated and each feedback point is provided with an independent circulating line.

In the first mode, the feedback points are mutually independent, and in this case, the current connected to each feedback point is also independent. In the second mode, the two feedback points are mutually associated, and in this case, the two feedback points are connected to the same line. In the case of a low level signal, the switching sub-circuit is switched to the second mode, which is equivalent to merging the two low-current lines together, such that the magnitude of current in the line is increased. Through the increase of current, the relative fluctuation of voltage is reduced, and the brightness of the LED tends to be stable without a change from high to low. Therefore, according to the technical solution, the brightness flicker of the LED is effectively reduced.

Embodiment 3

Figure 6:
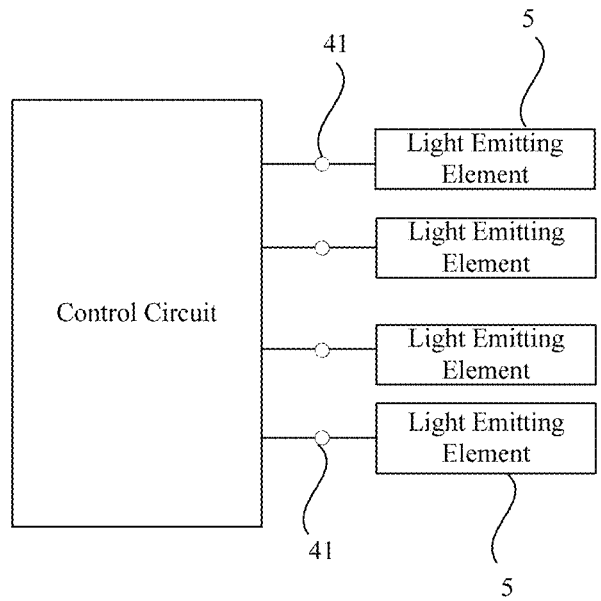
FIG. 6 is a schematic diagram of connections of light emitting elements connected with the control circuit according to a third embodiment of the present application.

Referring to FIG. 6, the present application further provides a displaying device, which includes a plurality of light emitting elements 5 and a control circuit, where the feedback points 41 are connected to the light emitting elements 5 in a one-to-one correspondence. The switching sub-circuit 2 in the control circuit controls the light emitting elements 5 to be turned on.

In the embodiment, the displaying device includes, but is not limited to, a liquid crystal display panel, an organic light-emitting diode display panel, a field emission display panel, a plasma display panel and a curved panel. The liquid crystal panel includes a thin film transistor liquid crystal display panel, a TN (IN represents Twisted Nematic) panel, a VA (VA represents Wide Viewing Angle) panel, an IPS (IPS represents In-Plane Switching) panel, etc.

The embodiments of the displaying device of the present application include all the technical solutions of all the embodiments of the above control circuit, and the technical effects achieved are the same, which will not be described here.

Although the present application has been described with reference to several exemplary embodiments, it is understood that the terminology, which has been used, is illustrative and exemplary, rather than restrictive. As the present application is embodied in several forms without departing from the spirit or essential characteristics thereof, it is also understood that the above embodiments are not limited by any of the details of the foregoing description, but rather being construed broadly within its spirit and scope as defined in the appended claims, and therefore all changes and modifications that fall within the scope of the claims or their equivalents are therefore intended to be embraced by the appended claims.

What is claimed is:

1. A control circuit, comprising:
a sampling sub-circuit configured to collect a level signal corresponding to a pulse width modulation signal;
a switching sub-circuit, wherein one end of the switching sub-circuit is connected to the sampling sub-circuit, the other end of the switching sub-circuit is connected to at least one group of signal feedback ends, wherein each of the at least one group of signal feedback ends comprises at least two feedback points, each of the at least two feedback points is configured to be connected to a light emitting element, and the switching sub-circuit is capable of being switched between a first mode and a second mode based on a relationship between the level signal and a preset threshold; and
a working power supply connected to the sampling sub-circuit and the switching sub-circuit and supplying power to the sampling sub-circuit and the switching sub-circuit;
wherein the switching sub-circuit comprises at least one group of constant current source components and at least one group of switch controlling components, and the at least one group of constant current source components, the at least one group of switch controlling components, and the at least one group of signal feedback ends are disposed in one-to-one correspondence,
wherein each of the at least one group of switch controlling components comprises a first switch and a second switch;
wherein each of the at least one group of constant current source components comprises at least two constant current sources, and each of the at least two constant current sources is provided with a power supply end, an input end, and an output end, wherein the input end is connected to the sampling sub-circuit through an input line, the power supply end is connected to the working power supply through a power supply line, and the output end is connected to a feedback point of the at least one group of signal feedback ends through a feedback line;
wherein among a plurality of power supply lines, one power supply line is provided without the first switch, and each remaining of the plurality of power supply lines is provided with the first switch;

wherein among the at least one group of signal feedback ends, each feedback line is connected to each of the at least two feedback points through the second switch;

wherein in the first mode, the first switches are turned on, and the second switches are turned off; and wherein in the second mode, the first switches are turned off, and the second switches are turned on.

2. The control circuit according to claim 1, wherein the switching sub-circuit comprises a plurality of constant current source components disposed in parallel, and each of the plurality of constant current source components is connected to one group of the at least one group of signal feedback ends.

3. The control circuit according to claim 1, wherein the switching sub-circuit further comprises a controller connected to the at least one group of switch controlling components, and the controller is configured to control the on or off of the first switches and the on or off of the second switches.

4. The control circuit according to claim 1, wherein each of the at least two constant current sources comprises:
    a first operational amplifier, wherein a positive pole of a power supply of the first operational amplifier is connected to the working power supply, a negative pole of the power supply of the first operational amplifier is grounded, a signal input positive pole of the first operational amplifier is connected to the sampling sub-circuit;
    a first resistor, wherein a signal input negative pole of the first operational amplifier is connected to the first resistor, the other end of the first resistor is grounded, and
    a first field-effect transistor, wherein a signal output end of the first operational amplifier is connected to the first field-effect transistor, one end of the first field-effect transistor is connected to the first resistor, and the other end of the first field-effect transistor is connected to one of the at least two feedback points.

5. The control circuit according to claim 1, wherein the sampling sub-circuit comprises a second operational amplifier, a second field-effect transistor, a first sampling point, and a second sampling point, wherein the first sampling point is connected to a signal input positive pole of the second operational amplifier, the second sampling point is connected to a control end of the second field-effect transistor, and wherein the sampling sub-circuit further comprises a second resistor, wherein one end of the second field-effect transistor is connected to the second resistor, the other end of the second resistor is grounded, and the other end of the second field-effect transistor is connected to a signal input negative pole of the second operational amplifier.

6. The control circuit according to claim 5, wherein the sampling sub-circuit further comprises a third resistor, wherein one end of the third resistor is connected to the signal input negative pole of second operational amplifier, the other end of the third resistor is grounded, and a circuit formed by the second field-effect transistor and the second resistor is connected in parallel with the third resistor.

7. A control method, comprising:
    controlling a sampling sub-circuit to collect a level signal corresponding to a pulse width modulation signal, and transmitting the level signal to a switching sub-circuit, wherein one end of the switching sub-circuit is connected to the sampling sub-circuit, the other end of the switching sub-circuit is connected to at least one group of signal feedback ends, wherein each of the at least one group of signal feedback ends comprises at least two feedback points, each of the at least two feedback points is configured to be connected to a light emitting element, and the switching sub-circuit and the sampling sub-circuit are both connected to a working power supply; and
    controlling the switching sub-circuit to receive the level signal, and controlling the switching sub-circuit to be switched between a first mode and a second mode based on a relationship between the level signal and a preset threshold;
    wherein the switching sub-circuit comprises at least one group of constant current source components and at least one group of switch controlling components, and the at least one group of constant current source components, the at least one group of switch controlling components, and the at least one group of signal feedback ends are disposed in one-to-one correspondence,
    wherein each of the at least one group of switch controlling components comprises a first switch and a second switch;
    wherein each of the at least one group of constant current source components comprises at least two constant current sources, and each of the at least two constant current sources is provided with a power supply end, an input end, and an output end, wherein the input end is connected to the sampling sub-circuit through an input line, the power supply end is connected to the working power supply through a power supply line, and the output end is connected to a feedback point of the at least one group of signal feedback ends through a feedback line;
    wherein among a plurality of power supply lines, one power supply line is provided without the first switch, and each remaining of the plurality of power supply lines is provided with the first switch;
    wherein among the at least one group of signal feedback ends, each feedback line is connected to each of the at least two feedback points through the second switch;
    wherein in the first mode, the first switches are turned on, and the second switches are turned off; and
    wherein in the second mode, the first switches are turned off, and the second switches are turned on.

8. The control method according to claim 7, wherein the step of controlling the switching sub-circuit to be switched between the first mode and the second mode based on the relationship between the level signal and the preset threshold comprises:
    acquiring a duty ratio representative of the level signal from a pulse width modulated signal;
    comparing the duty ratio with a preset threshold;
    when the duty ratio is less than the preset threshold, outputting a first switching instruction, and controlling the switching sub-circuit to be switched to the second mode according to the first switching instruction; and
    when the duty ratio is greater than or equal to the preset threshold, outputting a second switching instruction, and controlling the switching sub-circuit to be switched to the first mode according to the second switching instruction.

9. The control method according to claim 8, wherein the preset threshold ranges from 0.1% to 10%.

10. The control method according to claim 7, wherein the switching sub-circuit comprises a plurality of constant current source components disposed in parallel, and each of the plurality of constant current source components is connected to one group of the at least one group of signal feedback ends.

11. The control method according to claim 7, wherein each of the at least two constant current source comprises:
   a first operational amplifier, wherein a positive pole of a power supply of the first operational amplifier is connected to the working power supply, a negative pole of the power supply of the first operational amplifier is grounded, a signal input positive pole of the first operational amplifier is connected to the sampling sub-circuit;
   a first resistor, wherein a signal input negative pole of the first operational amplifier is connected to the first resistor, the other end of the first resistor is grounded, and
   a first field-effect transistor, wherein a signal output end of the first operational amplifier is connected to the first field-effect transistor, one end of the first field-effect transistor is connected to the first resistor, and the other end of the first field-effect transistor is connected to one of the at least two feedback points.

12. A displaying device, comprising a plurality of light emitting elements and a control circuit, wherein feedback points are connected to the plurality of light emitting elements in a one-to-one correspondence, and the control circuit comprises:
   a sampling sub-circuit configured to collect a level signal corresponding to a pulse width modulation signal;
   a switching sub-circuit, wherein one end of the switching sub-circuit is connected to the sampling sub-circuit, the other end of the switching sub-circuit is connected to at least one group of signal feedback ends, wherein each of the at least one group of signal feedback ends comprises at least two feedback points, each of the at least two feedback points is configured to be connected to a light emitting element, and the switching sub-circuit is capable of being switched between a first mode and a second mode based on a relationship between the level signal and a preset threshold; and
   a working power supply connected to the sampling sub-circuit and the switching sub-circuit and supplying power to the sampling sub-circuit and the switching sub-circuit;
   wherein the switching sub-circuit comprises at least one group of constant current source components and at least one group of switch controlling components, and the at least one group of constant current source components, the at least one group of switch controlling components, and the at the at least one group of signal feedback ends are disposed in one-to-one correspondence;
   wherein each of the at least one group of switch controlling components comprises a first switch and a second switch;
   wherein each of the at least one group of constant current source components comprises at least two constant current sources, and each of the at least two constant current sources is provided with a power supply end, an input end, and an output end, wherein the input end is connected to the sampling sub-circuit through an input line, the power supply end is connected to the working power supply through a power supply line, and the output end is connected to a feedback point of the at least one group of signal feedback ends through a feedback line;
   wherein among a plurality of power supply lines, one power supply line is provided without the first switch, and each remaining of the plurality of power supply lines is provided with the first switch;
   wherein among the at least one group of signal feedback ends, each feedback line is connected to each of the at least two feedback points through the second switch;
   wherein in the first mode, the first switches are turned on, and the second switches are turned off; and
   wherein in the second mode, the first switches are turned off, and the second switches are turned on.

13. The displaying device according to claim 12, wherein the switching sub-circuit comprises a plurality of constant current source components disposed in parallel, and each of the plurality of constant current source components is connected to one group of the at least one group of signal feedback ends.

14. The displaying device according to claim 12, wherein the switching sub-circuit further comprises a controller connected to the at least one group of switch controlling components, and the controller is configured to control the on or off of the first switches and the on or off of the second switches.

15. The displaying device according to claim 12, wherein each of the at least two constant current sources comprises:
   a first operational amplifier, wherein a positive pole of a power supply of the first operational amplifier is connected to the working power supply, a negative pole of the power supply of the first operational amplifier is grounded, a signal input positive pole of the first operational amplifier is connected to the sampling sub-circuit;
   a first resistor, wherein a signal input negative pole of the first operational amplifier is connected to the first resistor, the other end of the first resistor is grounded, and
   a first field-effect transistor, wherein a signal output end of the first operational amplifier is connected to the first field-effect transistor, one end of the first field-effect transistor is connected to the first resistor, and the other end of the first field-effect transistor is connected to one of the at least two feedback points.

16. The displaying device according to claim 12, wherein the sampling sub-circuit comprises a second operational amplifier, a second field-effect transistor, a first sampling point, and a second sampling point, wherein the first sampling point is connected to a signal input positive pole of the second operational amplifier, the second sampling point is connected to a control end of the second field-effect transistor, and wherein the sampling sub-circuit further comprises a second resistor, wherein one end of the second field-effect transistor is connected to the second resistor, the other end of the second resistor is grounded, and the other end of the second field-effect transistor is connected to a signal input negative pole of the second operational amplifier.

17. The displaying device according to claim 16, wherein the sampling sub-circuit further comprises a third resistor, wherein one end of the third resistor is connected to the signal input negative pole of the second operational amplifier, the other end of the third resistor is grounded, and a circuit formed by the second field-effect transistor and the second resistor is connected in parallel with the third resistor.

* * * * *